United States Patent
Kurian

(10) Patent No.: US 11,153,069 B2
(45) Date of Patent: Oct. 19, 2021

(54) DATA AUTHENTICATION USING A BLOCKCHAIN APPROACH

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 628 days.

(21) Appl. No.: 15/906,016

(22) Filed: Feb. 27, 2018

(65) Prior Publication Data

US 2019/0268139 A1    Aug. 29, 2019

(51) Int. Cl.
| | |
|---|---|
| *H04L 9/32* | (2006.01) |
| *H04L 9/06* | (2006.01) |
| *H04L 9/14* | (2006.01) |
| *G06F 21/60* | (2013.01) |
| *H04L 9/30* | (2006.01) |

(52) U.S. Cl.
CPC .......... *H04L 9/0637* (2013.01); *G06F 21/602* (2013.01); *H04L 9/14* (2013.01); *H04L 9/30* (2013.01); *H04L 9/3239* (2013.01); *H04L 9/3242* (2013.01); *H04L 9/3247* (2013.01); *H04L 2209/38* (2013.01)

(58) Field of Classification Search
CPC ..... H04L 2209/38; H04L 9/0637; H04L 9/14; H04L 9/30; H04L 9/3247; H04L 9/3242; H04L 9/3239; H04L 9/0643
See application file for complete search history.

(56) References Cited

U.S. PATENT DOCUMENTS

| | | | |
|---|---|---|---|
| 9,298,806 B1 | 3/2016 | Vessenes et al. | |
| 9,397,985 B1 | 7/2016 | Seger, II et al. | |
| 10,140,470 B2 | 11/2018 | Kurian et al. | |
| 10,567,156 B2 | 2/2020 | Castinado et al. | |
| 2016/0261404 A1 | 9/2016 | Ford et al. | |
| 2016/0292680 A1 | 10/2016 | Wilson, Jr. et al. | |
| 2017/0140375 A1 | 5/2017 | Kunstel | |
| 2017/0178237 A1 | 6/2017 | Wong | |
| 2018/0165476 A1* | 6/2018 | Carey | G06F 21/577 |
| 2018/0219671 A1* | 8/2018 | Velissarios | H04L 63/08 |
| 2018/0225660 A1 | 8/2018 | Chapman et al. | |

(Continued)

OTHER PUBLICATIONS

Mar. 6, 2020—U.S. Notice of Allowance—U.S. Appl. No. 15/906,084.

*Primary Examiner* — Trong H Nguyen
(74) *Attorney, Agent, or Firm* — Banner & Witcoff, Ltd.; Michael A. Springs

(57) ABSTRACT

Aspects of the disclosure relate to multicomputer systems and methods for data authentication using a blockchain approach. Any full node computing device in a network, including a data authentication and event execution computing platform, may receive a data block from one or more sources. The computing platform may parse the data block to identify a key including metadata associated with the data block. Then the computing platform may determine that this key forms a key pair with another key associated with the most recently added block to the blockchain. Once this determination has been made, the block may be added to the blockchain. Thereafter, the computing platform may generate a notification indicating that the block has been added to the blockchain and may transmit the notification to one or more network devices.

18 Claims, 13 Drawing Sheets

(56) References Cited

U.S. PATENT DOCUMENTS

| | | |
|---|---|---|
| 2018/0254841 A1* | 9/2018 | Nannra ................ H04L 9/3236 |
| 2018/0276662 A1* | 9/2018 | Zavesky ............ G06Q 20/3224 |
| 2018/0293556 A1* | 10/2018 | Hyun ................ G06Q 20/4014 |
| 2019/0123895 A1* | 4/2019 | Blake ...................... H04L 67/40 |
| 2019/0164160 A1* | 5/2019 | Duran .................... G07F 7/082 |
| 2019/0207781 A1* | 7/2019 | Harpur ................... G06F 40/20 |
| 2019/0268466 A1* | 8/2019 | Inoue .................... H04L 9/3247 |
| 2019/0378142 A1 | 12/2019 | Darnell et al. |
| 2020/0036514 A1 | 1/2020 | Christensen et al. |
| 2020/0067708 A1 | 2/2020 | Subba |

* cited by examiner

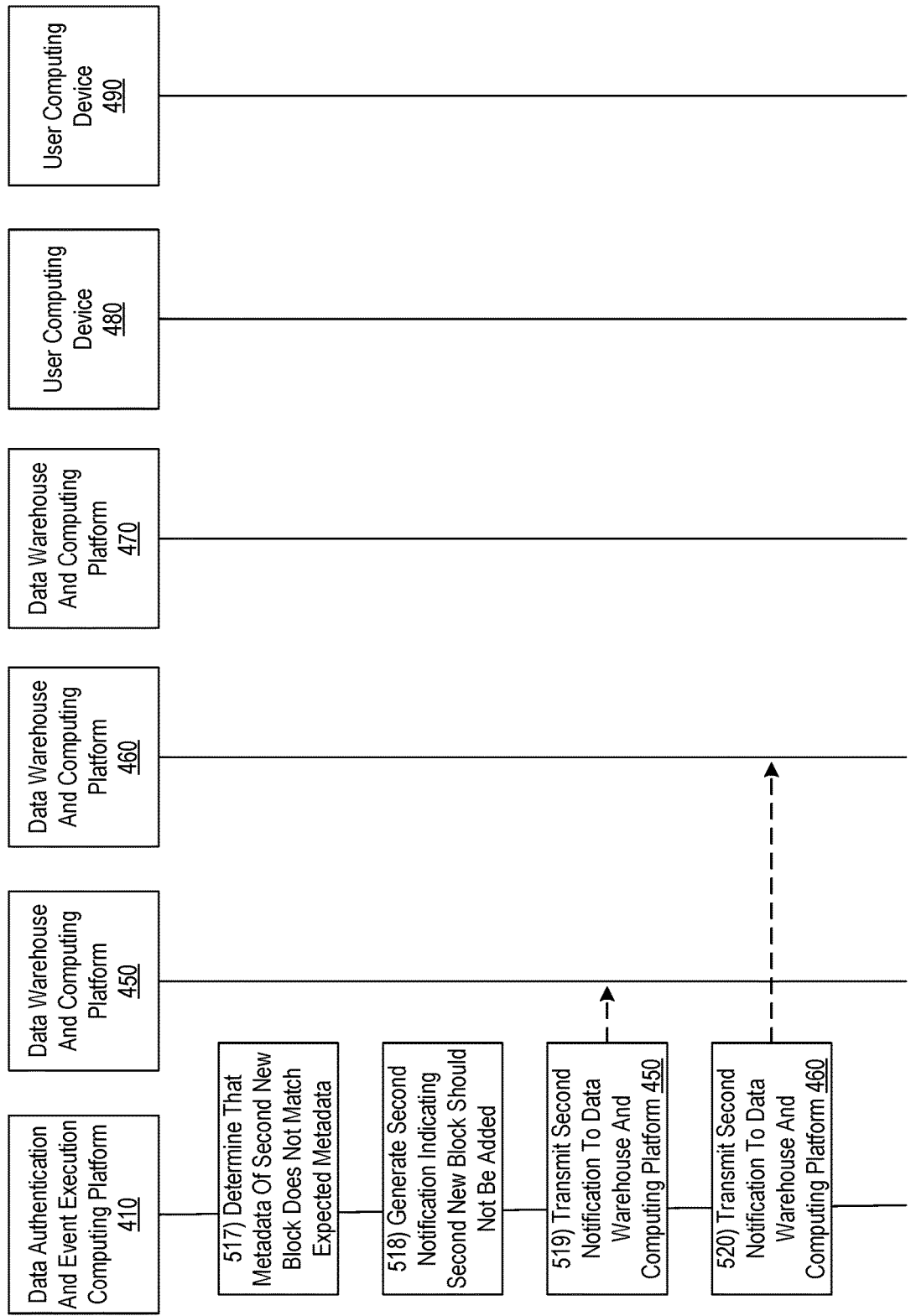

DATA AUTHENTICATION USING A BLOCKCHAIN APPROACH

CROSS-REFERENCE TO RELATED APPLICATIONS

This application is related to U.S. application Ser. No. 15/906,084 (now U.S. Pat. No. 10,693,646), entitled "Event Execution Using A Blockchain Approach," which is being filed concurrently with this application and which is herein incorporated by reference in its entirety.

BACKGROUND

Aspects of the disclosure relate to electrical computers, digital processing systems, and multicomputer data processing of user data using a blockchain approach. In particular, one or more aspects of the disclosure relate to enabling multicomputer processing and authentication of data from computing platforms and user computing devices. Once this data has been authenticated, aspects of the disclosure further relate to execution of events related to the data.

As computer systems are increasingly utilized to provide automated and electronic services, such computer systems may obtain and maintain increasing amounts of various types of sensitive information, and ensuring the safety, security, and accuracy of this information may be increasingly important. In many instances, however, it may be difficult to ensure the safety and security of such information while also optimizing the efficient and effective technical operations of the computer systems that process such information and/or provide such automated and electronic services.

SUMMARY

Aspects of the disclosure provide effective, efficient, scalable, and convenient technical solutions that address and overcome the technical problems associated with authenticating data and optimizing the efficient and effective technical operations of computer systems. In particular, one or more aspects of the disclosure provide techniques for authenticating user data using multicomputer data processing technology and executing automated actions based on that data to improve data security and enhance technical performance.

In accordance with one or more embodiments, a data authentication and event execution computing platform having at least one processor, a memory, and a communication interface may receive, via the communication interface, a first new block to be added to a blockchain associated with a predetermined topic. Then the data authentication and event execution computing platform may parse the first new block to identify first data and a first key including first metadata associated with the first data. Subsequently, the data authentication and event execution computing platform may identify a second key including second metadata associated with second data included in a previously added block of the blockchain. Next, the data authentication and event execution computing platform may determine that the first key and the second key are configured to allow the first new block to be added to the blockchain. Based on the determination that the first key and the second key are configured to allow the first new block to be added to the blockchain, the data authentication and event execution computing platform may add the first new block to the blockchain. Next, the data authentication and event execution computing platform may generate a first notification indicating that the first new block has been added to the blockchain. Finally, the data authentication and event execution computing platform may transmit, via the communication interface, the first notification to a plurality of network devices.

In some embodiments, the first data may be encrypted using a first hashing algorithm and the first key may not be encrypted. In some aspects, determining that the first key and the second key are configured to allow the first new block to be added to the blockchain may comprise determining that the first key and the second key form a public and private key relationship. In other aspects, determining that the first key and the second key are configured to allow the first new block to be added to the blockchain may comprise determining that the first data and the second data are associated with a first geographic location. In further aspects, determining that the first key and the second key are configured to allow the first new block to be added to the blockchain may comprise determining that the first data and the second data are associated with a first sensitivity level. In other aspects, determining that the first key and the second key are configured to allow the first new block to be added to the blockchain may comprise determining that the first data and the second data are associated with the predetermined topic. Further, determining that the first key and the second key are configured to allow the first new block to be added to the blockchain may comprise determining that the first data and the second data are associated with a predetermined checksum value.

In further aspects, the first metadata may provide a summary of information included in the first data and the second metadata may provide a summary of information included in the second data.

In other aspects, the data authentication and event execution computing platform may receive, via the communication interface, a plurality of authorizations to add the first new block to the blockchain from a quorum of the plurality of network devices. In this aspect, adding the first new block to the blockchain may be further based on the plurality of authorizations received from the quorum of the plurality of network devices. In addition, determining that the first key and the second key are configured to allow the first new block to be added to the blockchain may comprise determining that the first data is associated with a first time period and the second data is associated with a second time period. Here, the first time period may occur after the second time period.

In further aspects, parsing the first new block may further comprise parsing the first new block to further identify a third key including third metadata associated with expected data to be included in a subsequent block to be added to the blockchain. In other aspects, the data authentication and event execution computing platform may receive, via the communication interface, a second new block including fourth data and a fourth key. Here, the fourth key may include fourth metadata associated with the fourth data. Further, the data authentication and event execution computing platform may determine that the fourth metadata does not match the third metadata associated with the expected data to be included in the subsequent block to be added to the blockchain. Then, the data authentication and event execution computing platform may generate a second notification indicating that the second new block should not be added to the blockchain based on the determination that the fourth metadata does not match the third metadata associated with the expected data to be included in the subsequent block to be added to the blockchain. Finally, the data authentication and event execution computing platform may transmit, via the communication interface, the second notification to the plurality of network devices.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5G depict an illustrative event sequence for authentication of user data and execution of events based on the authentication in accordance with one or more example embodiments.

DETAILED DESCRIPTION

Figure 1:
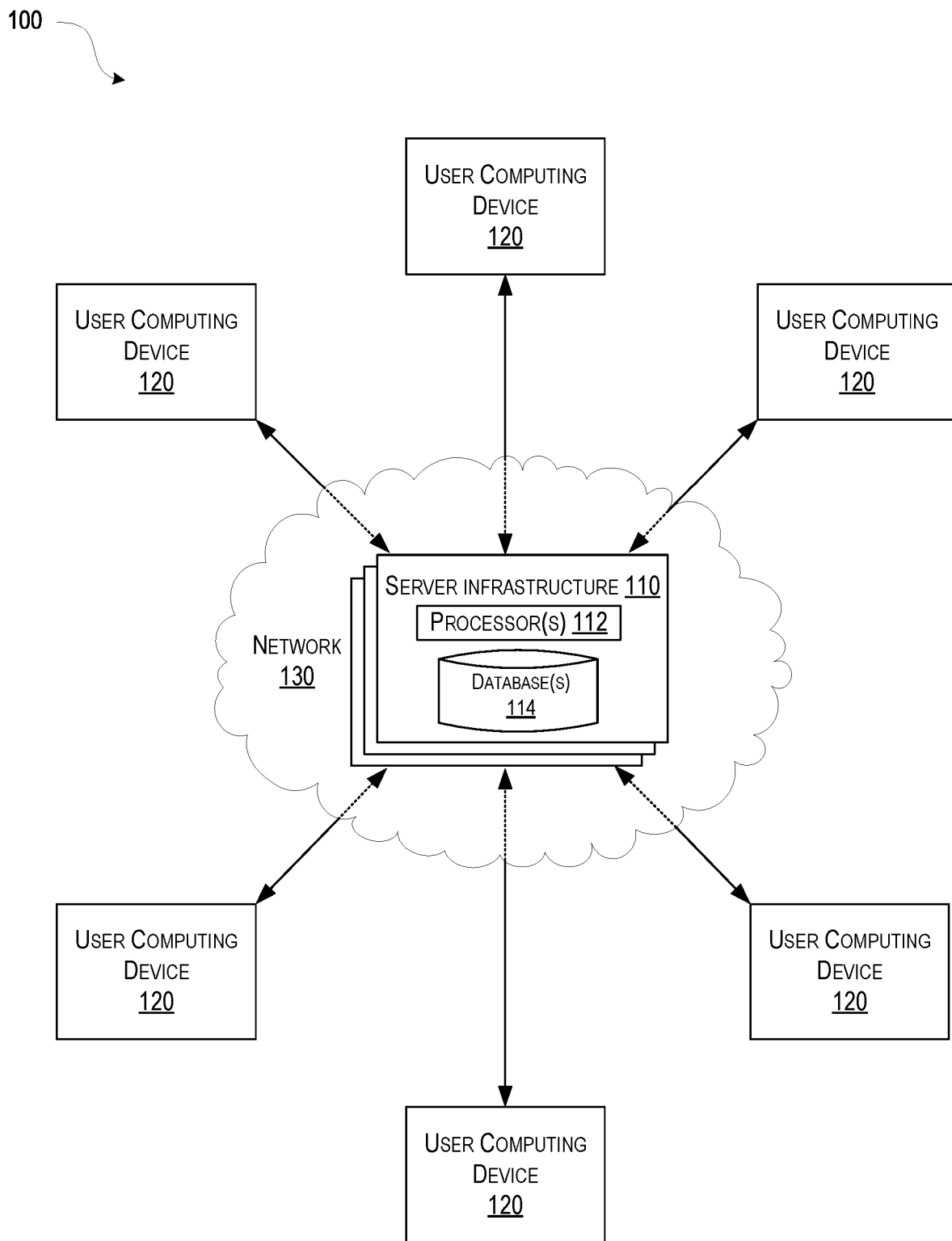
FIG. 1 depicts an illustrative example of a centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

As a general introduction to the subject matter described in more detail below, aspects described herein are directed towards authentication of user data and execution of events based on the authentication. In some aspects, the scheme described herein employs a decentralized computing system for creating and managing a blockchain.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations," "balance sheet transactions," and/or user data authentication. A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interconnect each of the computing devices comprising server infrastructure 110.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
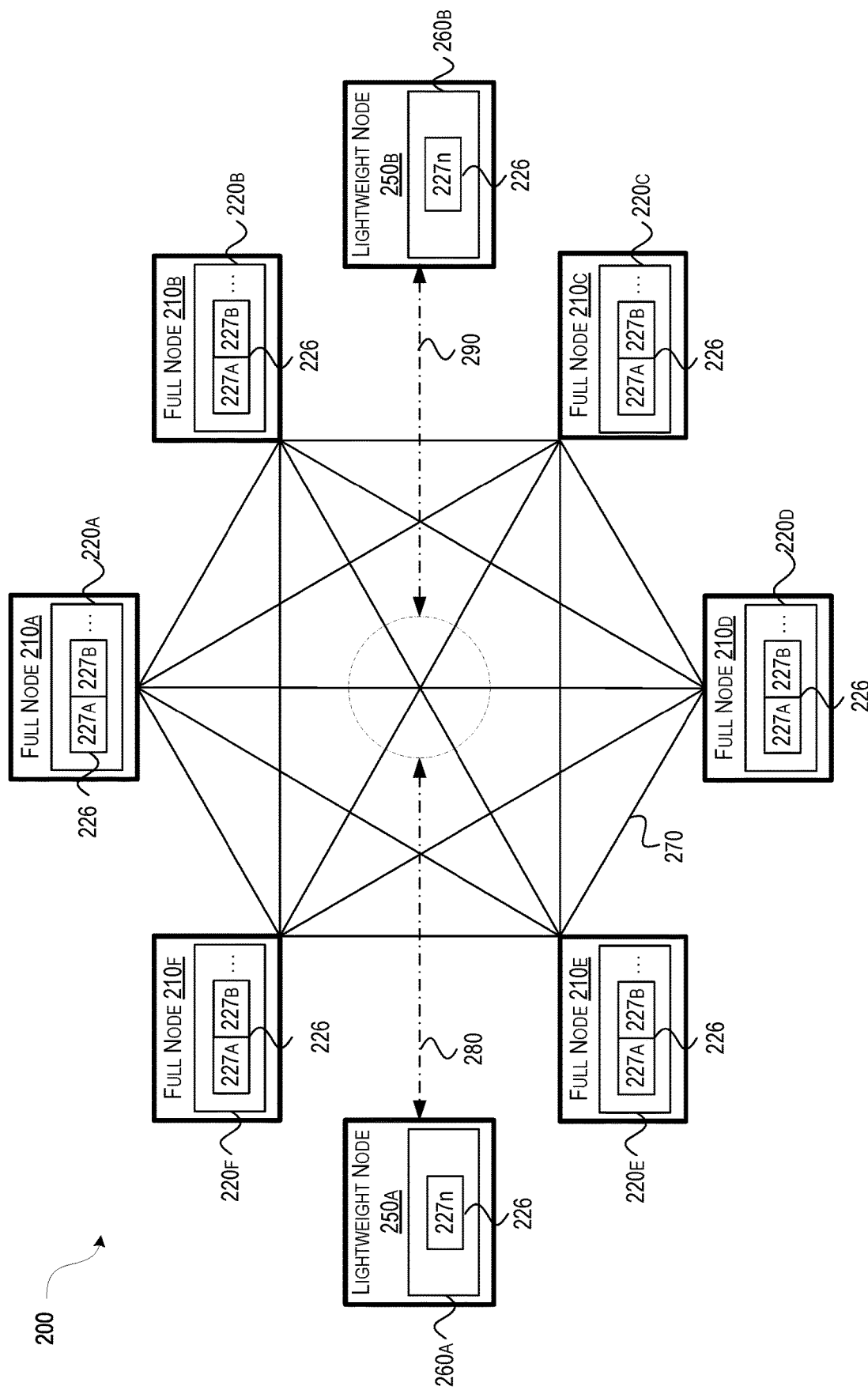
FIG. 2 depicts an illustrative example of a decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to blockchain 226 in decentralized P2P network 270, which may entail a data transfer from a private/public key associated with lightweight node computing device 250A to a private/public key associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with lightweight node computing device 250B. Processors of lightweight node computing device 250A may execute digital signature algorithms to digitally sign balance sheet transaction network function request 280 with the private key associated with lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain inter-nodal agreement as to the state of blockchain 226, processors, ASIC devices, and/or GPUs of full node computing devices 210A-210F may execute network protocols to receive the broadcast of the network function through a decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated with the public key of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective public keys. Full node computing devices 210A-210F, however, may not vote for themselves to be delegates. Once the group of delegates are chosen, the group of delegates from full node computing devices 210A-210F select a public key associated with one of full node computing devices 210A-210F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing balance sheet transaction network function request 280. After the new block has been added to blockchain 226, balance sheet transaction network function request 280 may be considered to be executed and the data transfer from the private/public key associated with lightweight node computing device 250A to the private/public key associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to blockchain 226 in decentralized P2P network 270, which may facilitate a dual data transfer between a private/public key associated with lightweight node computing device 250B and a private/public key associated lightweight node computing device 250A. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 260A for executing smart contract operation network function request 290. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract operation network function request. The smart contract operation network function request may further include the public key associated with the smart contract. Processors of lightweight node computing device 250A may execute digital signature algorithms to digitally sign the smart contract operation network function request with the private key associated with lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing the smart contract operation network function request. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3:
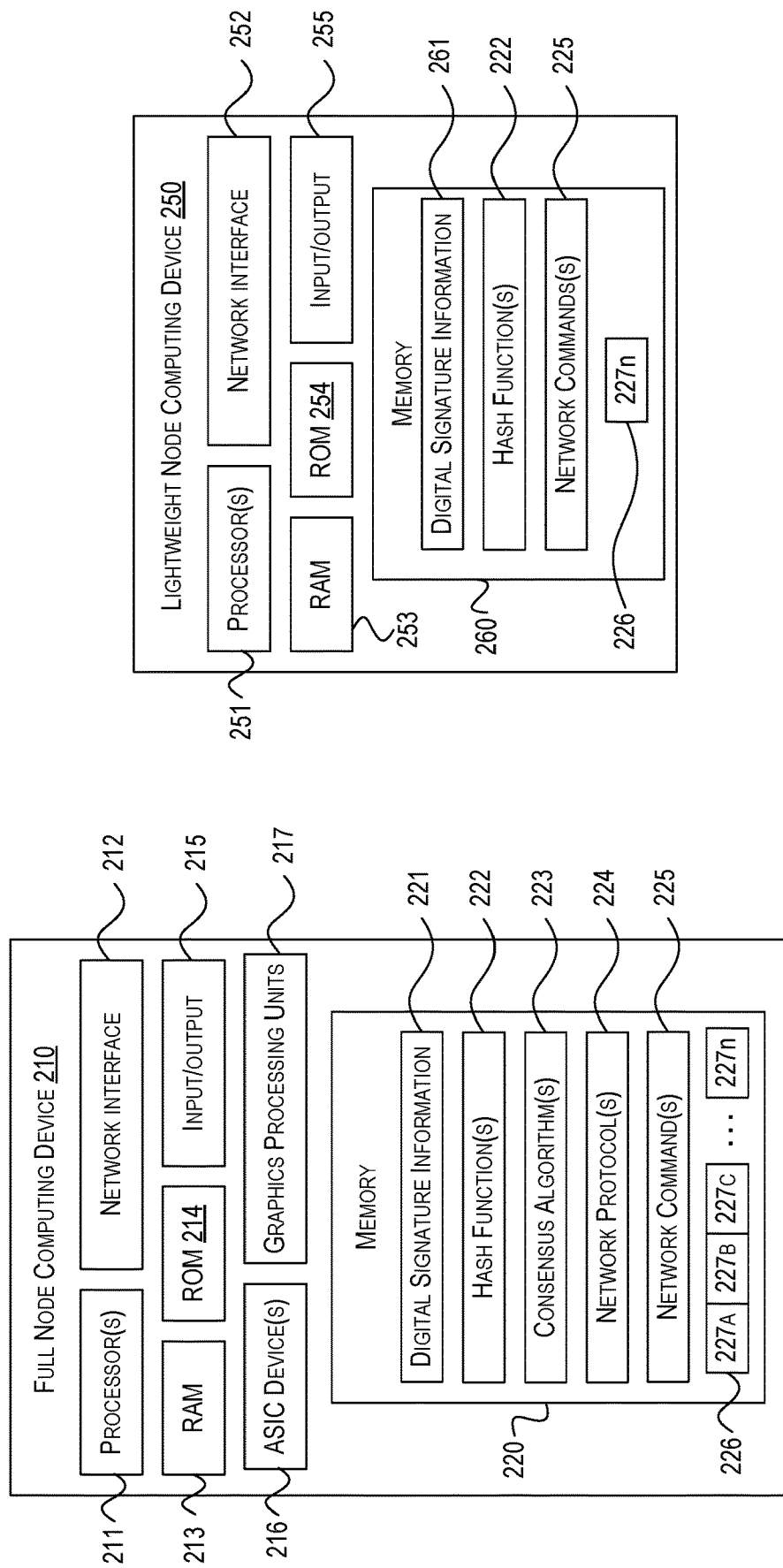
FIG. 3A depicts an illustrative example of a full node computing device that may be used in accordance with one or more illustrative aspects described herein.
FIG. 3B depicts an illustrative example of a lightweight node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227*n*, wherein block 227*n* represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

User Data Authentication and Event Execution

Figure 4:
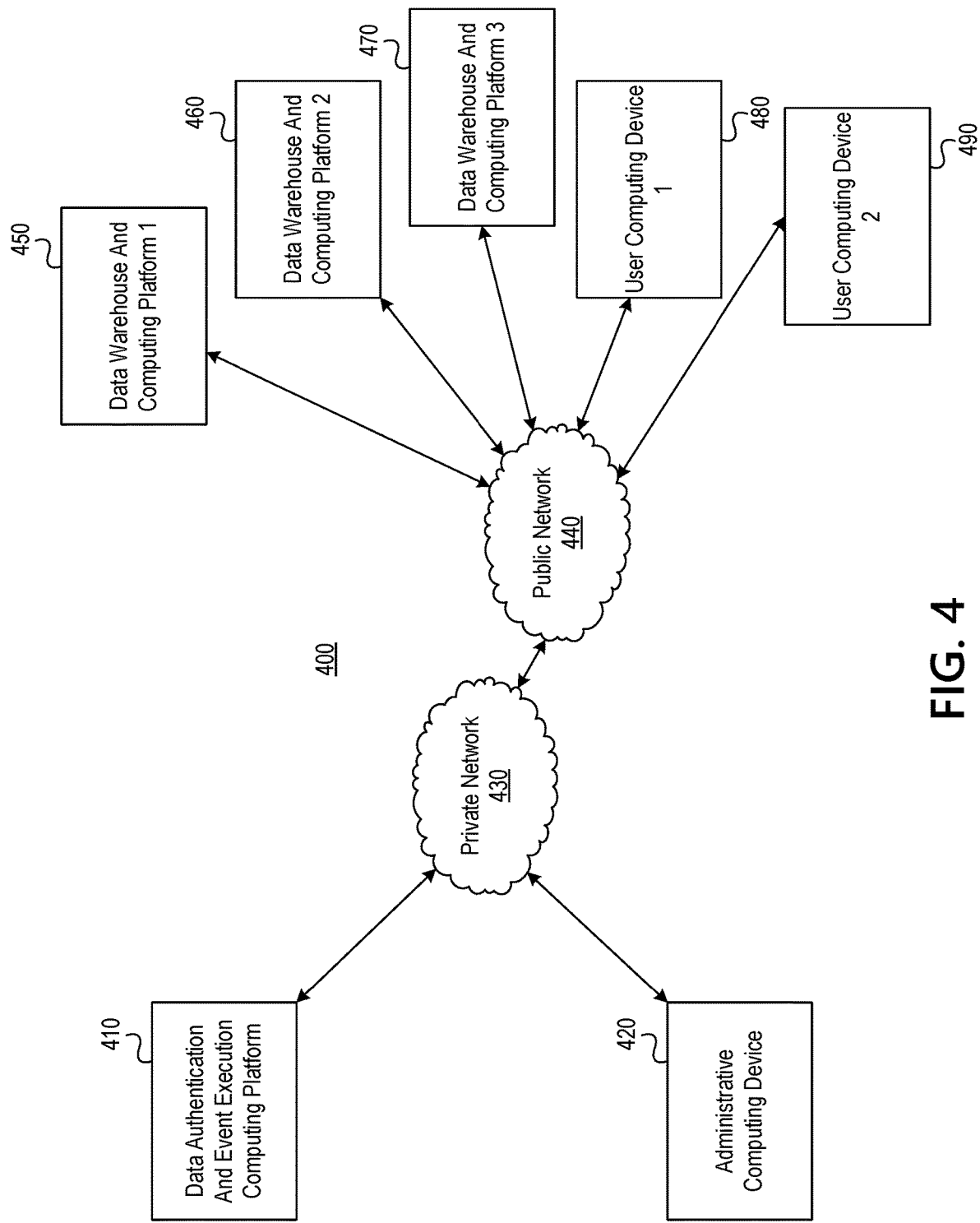
FIG. 4 depicts an illustrative computing environment for authentication of user data and execution of events based on the authentication in accordance with one or more example embodiments.

FIG. 4 depicts an illustrative computing environment for authentication of user data and execution of events based on the authentication in accordance with one or more example embodiments. Referring to FIG. 4, computing environment 400 may include one or more computer systems, one or more computer networks, and/or other computing infrastructure. For example, computing environment 400 may include a data authentication and event execution computing platform 410, an administrative computing device 420, a private network 430, a public network 440, data warehouse and computing platforms 450, 460, and 470, and user computing devices 480 and 490.

In addition to performing specific functions detailed further below, each of data authentication and event execution computing platform 410, administrative computing device 420, data warehouse and computing platforms 450-470, and user computing devices 480-490 may function as full node computing devices 210 or as lightweight node computing devices 250 to authenticate various types of user data, add the authenticated data to a given user's blockchain (e.g., after cryptographically hashing the authenticated data), maintain a copy of the current state of the user's blockchain, execute events related to the authenticated data when the data is part of a smart contract, and communicate with other network nodes functioning as lightweight node computing devices 250. In one embodiment, data authentication and event execution computing platform 410 may function as a full node computing device 210 and administrative computing device 420, data warehouse and computing platforms 450-470, and user computing devices 480-490 may function as lightweight node computing devices 250.

In other embodiments, more than one platform in computing environment 400 may function as a full node computing device 210. For example, data authentication and event execution computing platform 410, administrative computing device 420, data warehouse and computing platforms 450-470, and user computing devices 480-490 may all function as full node computing devices 210 in computing environment 400. In this example, data authentication and event execution computing platform 410, administrative computing device 420, data warehouse and computing platforms 450-470, and user computing devices 480-490 may all operate to create and maintain a decentralized network, execute requested network functions related to user data authentication and event execution, maintain inter-nodal agreement as to the state of the user's blockchain, and execute events related to the user data. In order to perform these functions, data authentication and event execution computing platform 410, administrative computing device 420, data warehouse and computing platforms 450-470, and user computing devices 480-490 may all have a complete replica or copy of a given blockchain stored in memory, as well as executable instructions for the execution of hash functions, consensus algorithms, digital signature information, network protocols, and network commands. In this example, data authentication and event execution computing platform 410, administrative computing device 420, data warehouse and computing platforms 450-470, and user computing devices 480-490 may authenticate data from any source. For example, a given blockchain may include user transaction data from merchant databases and other financial records databases, estate management data from estate management databases, inheritance data from inheritance records databases, medical records data from medical records databases, or data from other sources.

When functioning as a lightweight node 250, administrative computing device 420, data warehouse and computing platforms 450-470, and user computing devices 480-490 may request performance of network functions (e.g., to have user data authenticated onto the user's blockchain, to have smart contract operations executed after authentication of the underlying user data, and the like). However, when functioning as a lightweight node 250, administrative computing device 420, data warehouse and computing platforms 450-470, and user computing devices 480-490 may not have the capacity to execute the network functions and maintain inter-nodal agreement as to the state of any given blockchain.

As discussed in greater detail below, data authentication and event execution computing platform 410 may include one or more computing devices configured to perform one or more of the functions described herein. For example, data authentication and event execution computing platform 410 may include one or more computers (e.g., laptop computers, desktop computers, servers, server blades, or the like) that are configured to orchestrate data authentication operations and event execution operations across multiple computer systems and devices in computing environment 400.

Administrative computing device 420 may be a desktop computer, laptop computer, workstation, or other computing device that is configured to be used by an administrative user, such as a network administrator associated with an organization operating data authentication and event execution computing platform 410.

Data warehouse and computing platforms 450-470 may include one or more computing devices configured to receive, aggregate, and store records related to various types of data, including property ownership data, medical records data, inheritance records data, and the like. For example, data warehouse and computing platform 450 may receive and store deeds to homes owned by users in a given geographical area or may maintain a recordation of title transfers. Platform 450 may also communicate and/or otherwise provide select property records to one or more destination systems, such as data authentication and event execution computing platform 410, so as to enable one or more functions provided by data authentication and event execution computing platform 410 (e.g., such as data authentication and event execution functions). In some instances, the data communicated by platform 450 to data authentication and event execution computing platform 410 may be communicated via a secure and/or encrypted communications link established between data authentication and event execution computing platform 410 and platform 450.

In addition, platform 460 may include one or more computing devices configured to receive, aggregate, and store records related to the health and medical history of one or more users. For example, platform 460 may receive and store information related to when users received their last health screening, the results from the screening, any previous medical conditions associated with the users, medical procedures that these users underwent, and general comments from medical professionals about health-related issues associated with the users. Subsequently, platform 460 may communicate and/or otherwise provide select medical records to one or more destination systems, such as data authentication and event execution computing platform 410, so as to enable one or more functions provided by data authentication and event execution computing platform 410 (e.g., such as data authentication and event execution functions). In some instances, the data communicated by platform 460 to data authentication and event execution computing platform 410 may be communicated via a secure and/or encrypted communications link established between data authentication and event execution computing platform 410 and platform 460.

User computing devices 480-490 may be a desktop computer, laptop computer, workstation, mobile device, or other computing device that is configured to be used by a user to communicate in environment 400.

Computing environment 400 also may include one or more networks, which may interconnect one or more of data authentication and event execution computing platform 410, administrative computing device 420, data warehouse and computing platforms 450-470, and user computing devices 480-490. For example, computing environment 400 may include private network 430, which may be owned and/or operated by a specific organization and/or which may interconnect one or more systems and/or other devices associated with the specific organization. For example, data authentication and event execution computing platform 410 and administrative computing device 420 may be owned and/or operated by a specific organization, such as a financial institution, and private network 430 may interconnect data authentication and event execution computing platform 410, administrative computing device 420, and one or more other systems and/or devices associated with the organization. Additionally, private network 430 may connect (e.g., via one or more firewalls) to one or more external networks not associated with the organization, such as public network 440. Public network 440 may, for instance, include the internet and may connect various systems and/or devices not associated with the organization operating private network 430. For example, public network 440 may interconnect data warehouse and computing platforms 450-470, user computing devices 480-490, and/or various other systems and/or devices.

In some arrangements, the computing devices that make up and/or are included in data authentication and event execution computing platform 410, administrative computing device 420, data warehouse and computing platforms 450-470, and user computing devices 480-490 may be any type of computing device capable of receiving a user interface, receiving input via the user interface, and communicating the received input to one or more other computing devices. For example, the computing devices that make up and/or are included in data authentication and event execution computing platform 410, administrative computing device 420, data warehouse and computing platforms 450-470, and user computing devices 480-490 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in data authentication and event execution computing platform 410, administrative computing device 420, data warehouse and computing platforms 450-470, and user computing devices 480-490 may, in some instances, be special-purpose computing devices configured to perform specific functions.

Figure 5A:
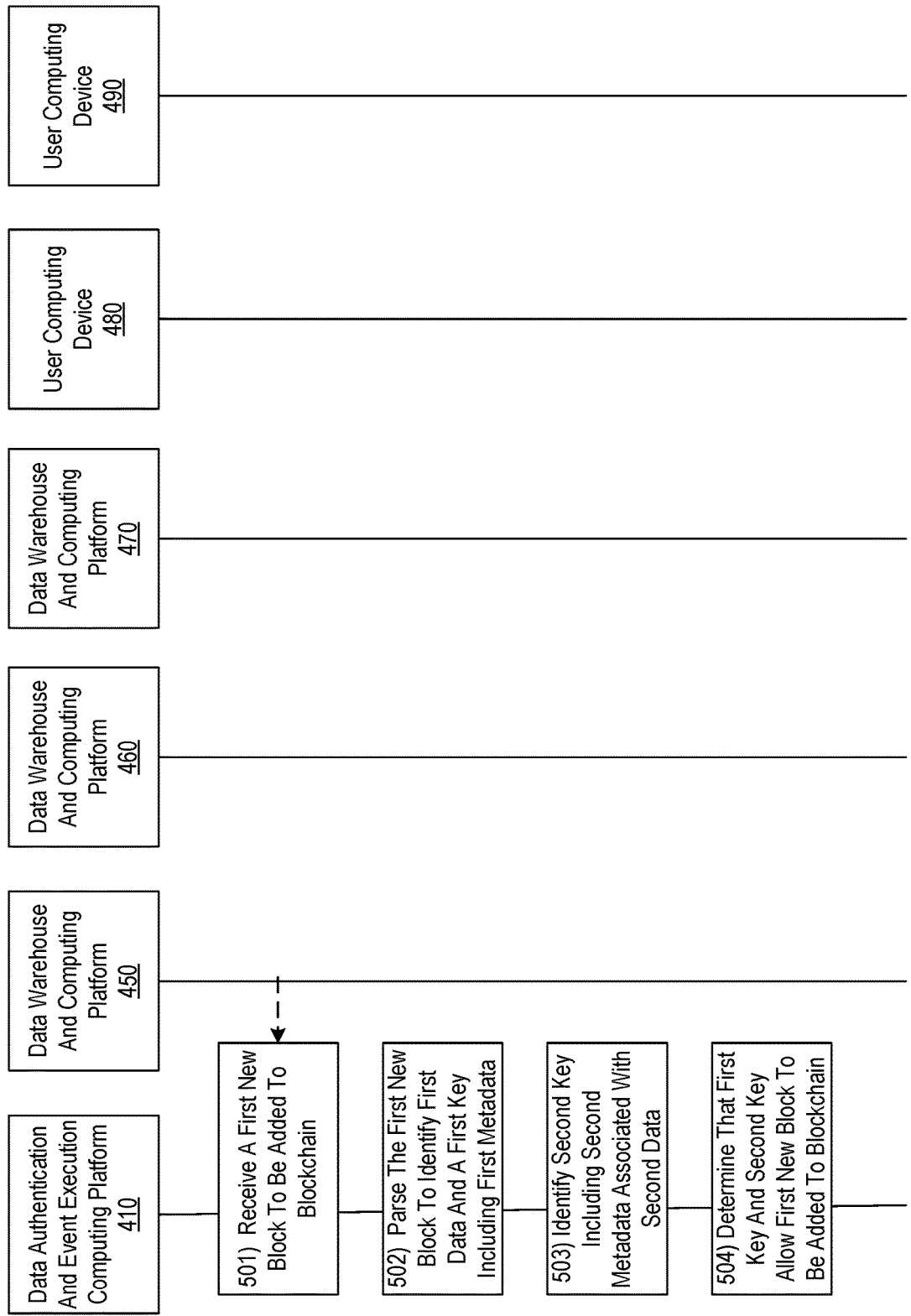

FIGS. 5A-5G depict an illustrative event sequence for authentication of user data and execution of events based on the authentication in accordance with one or more example embodiments. Although FIGS. 5A-5G depict an event sequence performed by data authentication and event execution computing platform 410, any device or computing platform, including data warehouse and computing platforms 450-470 or user computing devices 480-490 may perform one or more steps described in FIGS. 5A-5G. Referring to FIG. 5A, at step 501, data authentication and event execution computing platform 410 may receive, via a network or communication interface, such as network interface 212, a first new block to be added to a pre-existing blockchain associated with a predetermined topic. The predetermined topic may relate to a user's health, property, or financial records, among other topics. In general, the first new block may be received from any network device or computing platform, including data warehouse and computing platforms 450-470 and user computing devices 480-490. The information included in the blockchain may pertain to any type of data, including a given user's medical records data, financial transaction data, property records data, and the like. In one example, data authentication and event execution computing platform 410 may be operated by a financial institution such as a bank.

Then, in step 502, platform 410 may parse the first new block to identify first data within the block and a first key that includes first metadata associated with the identified data. In some aspects, the first data included in the first new block may be encrypted and may pertain to a given user's financial records, medical records, property records, and the like. For example, if the data included in the first new block pertains to a given user's medical records, then that data may be related to the user's latest health screening with a medical professional. Alternatively, if the data included in the first new block pertains to the user's property records, then that data may include a sale or title transfer of the user's property. Further still, if the data included in the first new block pertains to the user's financial records, then that data may include transaction data related to purchase of merchandise by the user.

In some aspects, the first key identified by platform 410 may represent an identifier, token, or other piece of data that provides additional security for securing the information in the blockchain. The first key may further include metadata associated with the data in the associated block. For example, if the data in the first new block corresponds to information related to a given user's latest health screening, then the metadata included in the first key may comprise a short phrase such as "health screening information." Further, the identifier included in the first key may be configured to recognize a specific complementary identifier of a second key associated with the most recently added block of the blockchain. Once recognized, the first key may further be configured to allow the first new block to be added to the most recently added block of the blockchain. In this way, the first key of the first new block and the second key of the most recently added block of the blockchain may form a complementary key pair. If, on the other hand, the first key of the first new block and the second key of the most recently added block of the blockchain do not form a complementary pair, then the first new block will not be added to the blockchain.

In some aspects, each block of the blockchain may be associated with two different keys. One of the keys may form a complementary pair with a complementary key on a block previous to the block in question and the second key may form a complementary pair with a complementary key on a block subsequent to the block in question. In some aspects, two complementary keys may represent a public and private key relationship with one another.

Moreover, whether two keys form a complementary pair may be based on various criteria. In some aspects, two keys may form a complementary pair only if the data included in the blocks to which they are associated relate to the same geographic location, such as the same latitude or longitude, same city, and the like. In other aspects, two keys may form a complementary pair if the data included in the blocks to which they are associated relate to the same sensitivity level. For example, the data included in the associated blocks may correspond to classified data or confidential data. In further aspects, two keys may form a complementary pair if the data included in the blocks to which they are associated relate to a predetermined topic, such as a given user's health records, property records, financial records, and the like. In yet other aspects, two keys may form a complementary pair if they are associated with a predetermined checksum value. Thus, the keys associated with a given block of a blockchain may provide an added level of security or control over which additional blocks may link to the blockchain.

Then in step 503, platform 410 may identify a second key including second metadata associated with second data included in a previously added block of the blockchain. This previously added block of the blockchain may correspond to the most recently added block of the blockchain. In step 504, platform 410 may determine that the first key of the first new block and the second key of the most recently added block of the blockchain are configured to allow the first new block to be added to the blockchain. As discussed above, this determination may be made based on whether the associated data is associated with the same geographic region, same sensitivity level, same topic, or a predetermined checksum value. In addition, this determination can be based on whether the data in the first new block is associated with a time period that occurs after the time period associated with the data in the most recently added block of the blockchain.

Figure 5B:
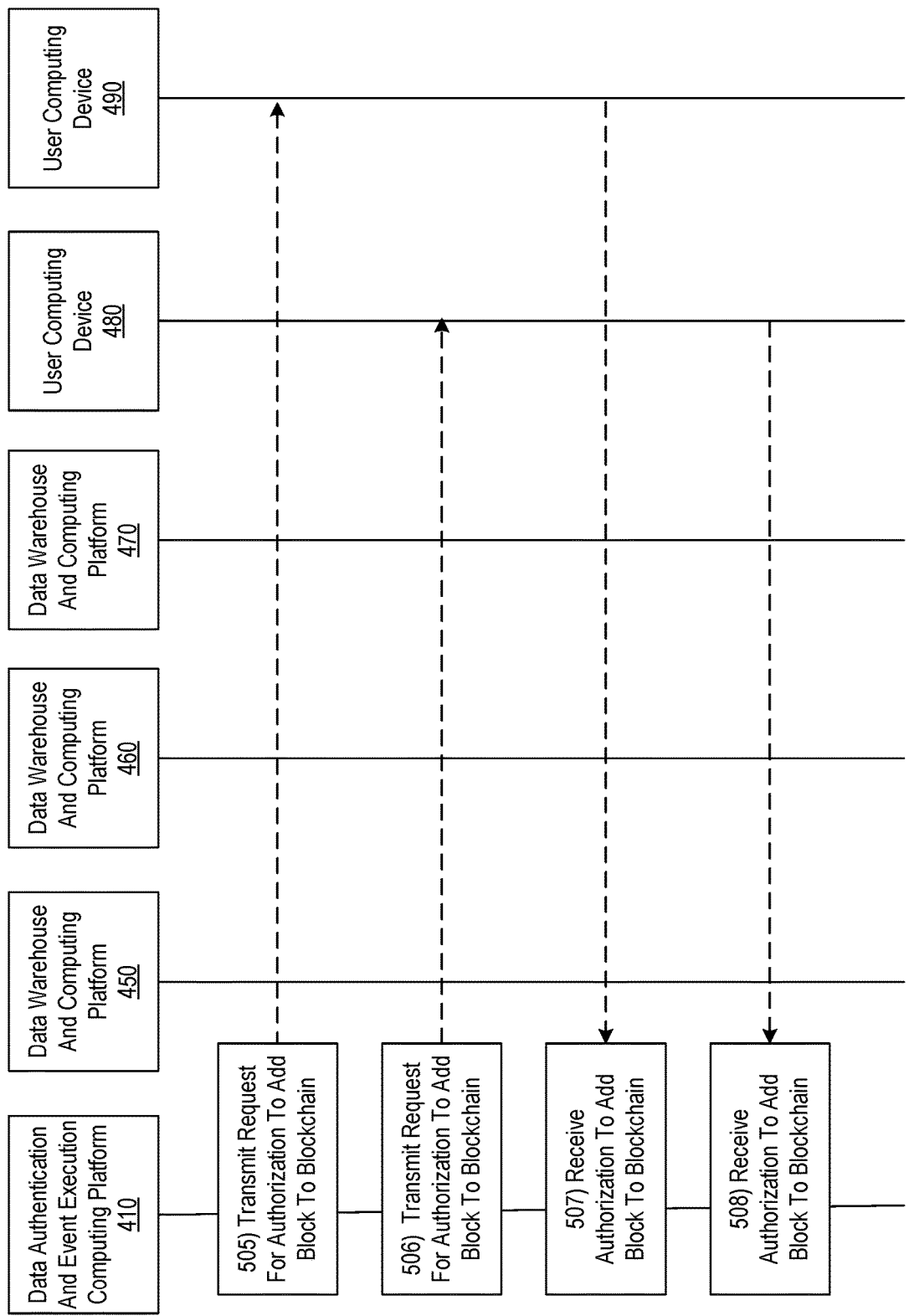
Figure 6:
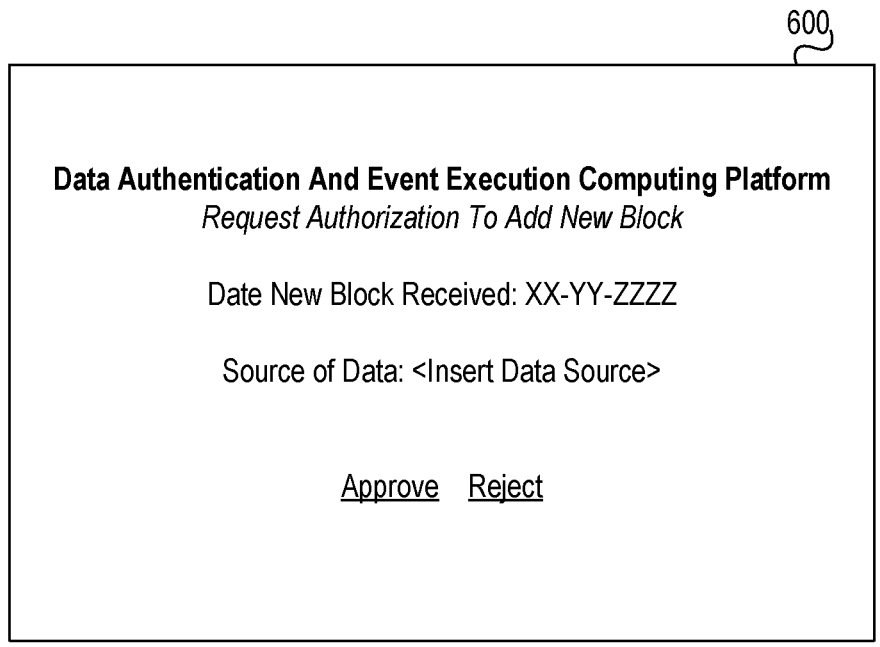
FIG. 6 depicts an example graphical user interface to obtain authorization for adding a new block to a blockchain in accordance with one or more example embodiments.

Referring to FIG. 5B, in steps 505-506, data authentication and event execution computing platform 410 may transmit a request for authorization to add the first new block to the blockchain to user computing devices 480-490. In other examples, platform 410 may transmit a request for authorization to add the first new block to the blockchain to any number of devices, including data warehouse and computing platforms 450-470 and user computing devices 480-490. In further examples, platform 410 may not transmit such a request to any of the devices in computing environment 400. Rather, platform 410 may rely on the determination made step 504. To request authorization to add a new block to a blockchain, data authentication and event execution computing platform 410 may cause user computing devices 480-490 to display and/or otherwise present a graphical user interface similar to graphical user interface 600, which is illustrated in FIG. 6. As shown in FIG. 6, graphical user interface 600 may include information related to the date the new block was received by platform 410 and the source of the data. In the example shown in FIG. 6, user computing devices 480-490 may approve or reject the request to authorize addition of the new block to the blockchain.

Then, in steps 507-508, platform 410 may receive authorization to add the first new block to the blockchain. If platform 410 did not receive the authorizations in steps 507-508, platform 410 may decide that the first new block cannot be added to the blockchain. In the scenario where platform 410 does not receive an authorization to add the first new block to the blockchain from one or more devices, platform 410 may still determine that the first new block can be added to the blockchain so as long as a quorum of computing devices and platforms provide authorization to add the first new block to the blockchain. For example, when five devices (data warehouse and computing platform 450-470, user computing devices 480-490) operate in environment 400, a quorum of those devices would be three.

Figure 5C:
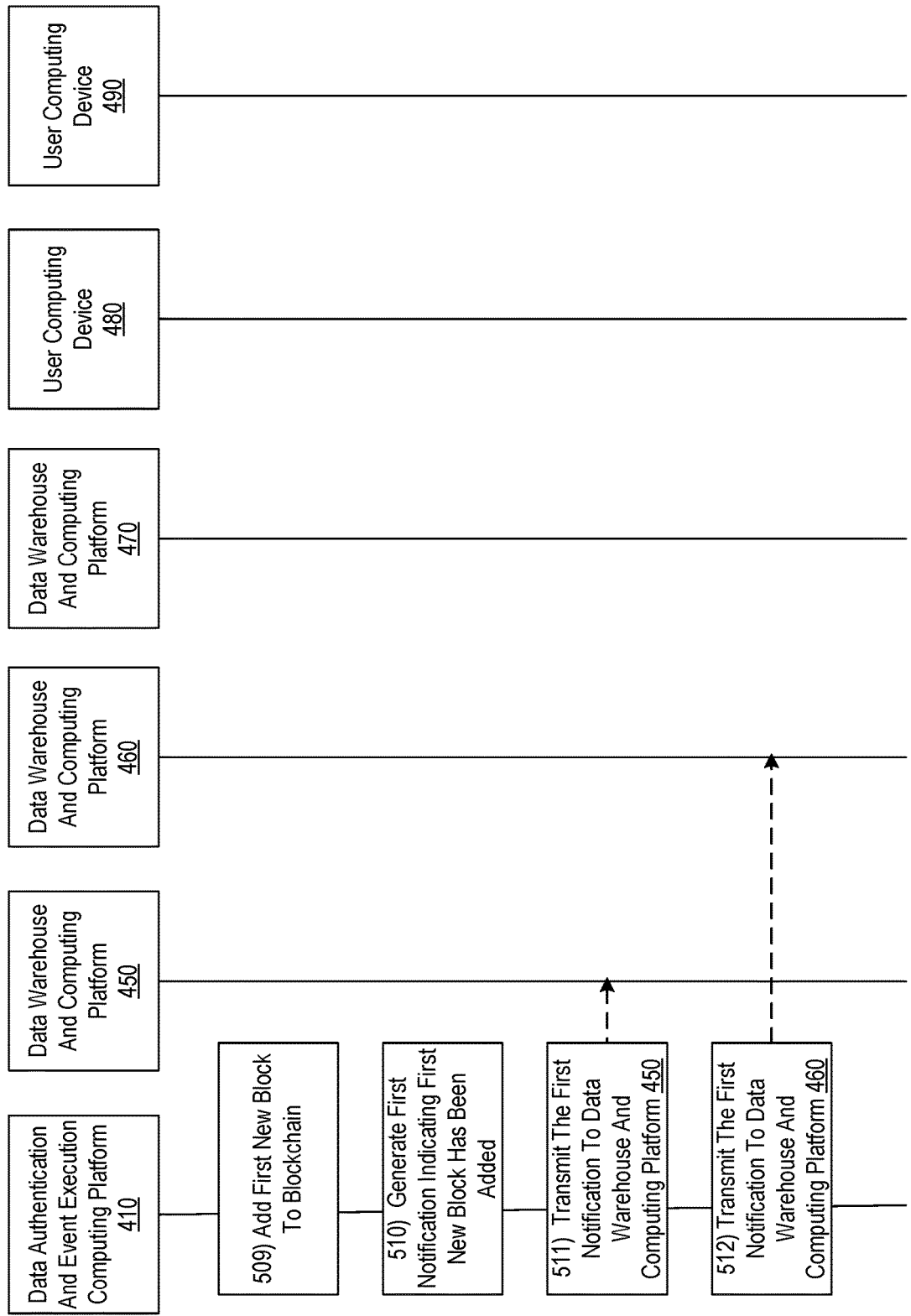
Figure 5D:
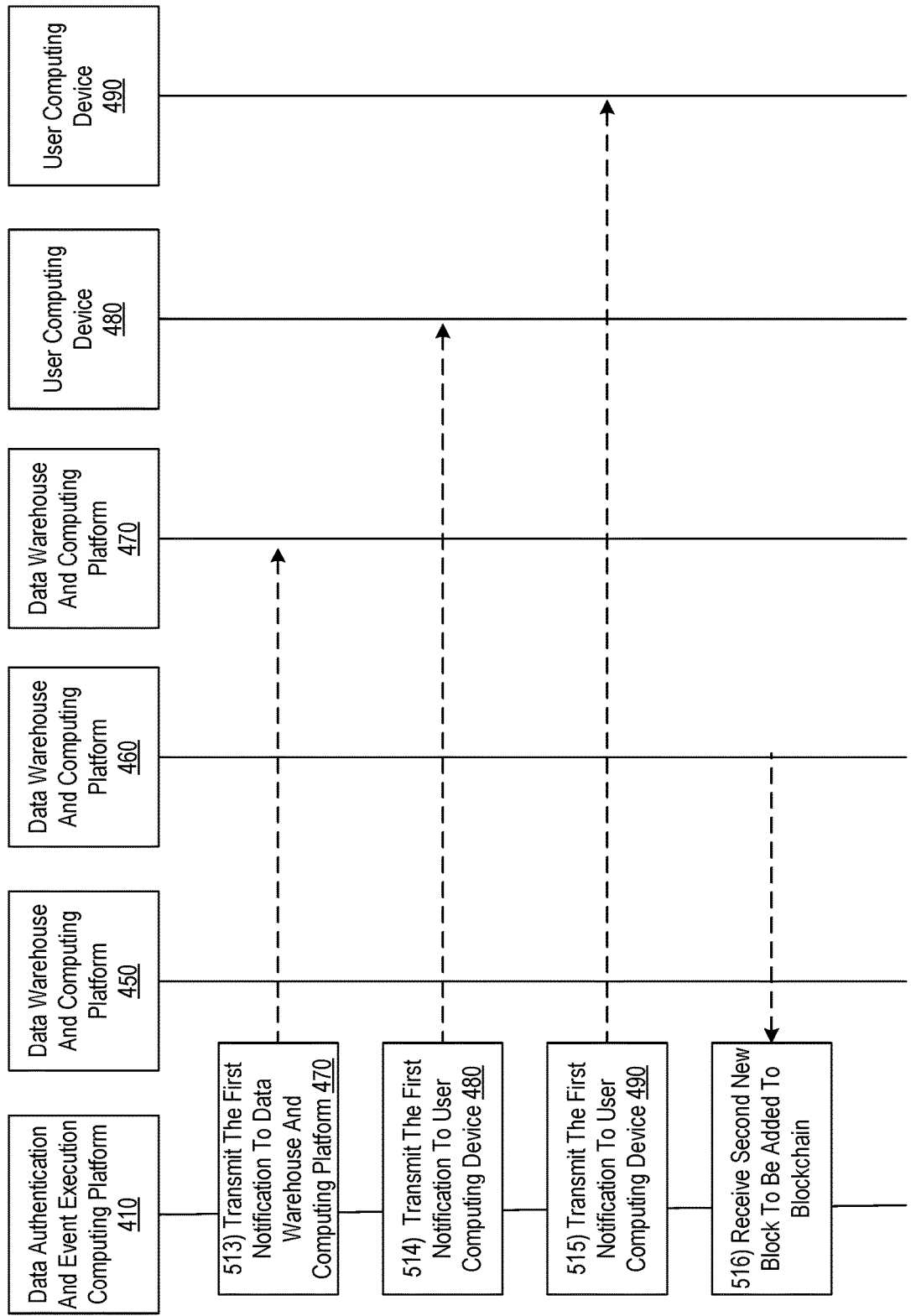

Referring next to FIG. 5C, the process may then move to step 509 where platform 410 may add the first new block to the blockchain (assuming that the necessary authorizations have been received in steps 507-508). The first new block would be added to the most recently added block so that the first key of the first new block and the second key of the most recently added block of the blockchain would form a key pair. Then, in step 510, platform 410 may generate a first notification indicating that that the first new block has been added to the blockchain. Referring to FIGS. 5C-5D, in steps 511-515, platform 410 may transmit the first notification to data warehouse and computing platforms 450-470 and user computing devices 480-490 (assuming that platforms 450-470 and devices 480-490 operate as full node computing devices storing the entire blockchain). In other examples, platform 410 may transmit the notification to only a subset of the devices operating in environment 400 or to none of the devices operating in environment 400. The notification may include a copy of the updated blockchain.

Figure 7:
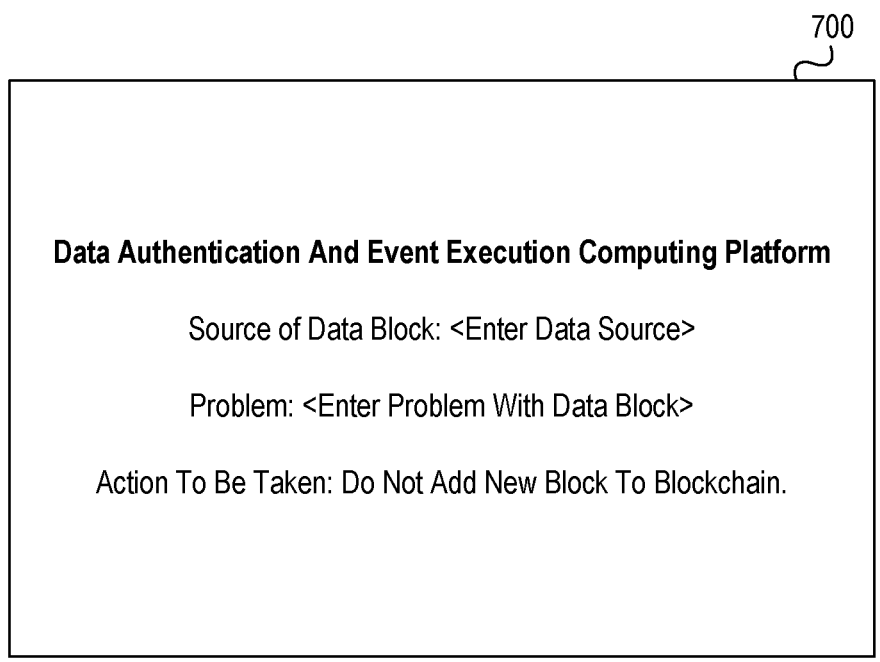
FIG. 7 depicts an example message transmitted from a data authentication and event execution computing platform indicating that a new block will not be added to the blockchain in accordance with one or more example embodiments.

In step 516, platform 410 may receive, from data warehouse and computing platform 460, a second new block to be added to the blockchain. Generally, platform 410 may receive the second new block from any of the devices or computing platforms operating in environment 400. The second new block may include its own data and may be associated with one or more keys. One or more of these keys may include metadata associated with the data included in the second new block. Referring to FIG. 5E, in step 517, platform 410 may determine that metadata associated with the second new block does not match metadata expected to be included in the subsequent block to be added to the blockchain. More specifically, when analyzing the first new block, platform 410 may identify an additional key including additional metadata associated with expected data to be included in a subsequent block to be added to the blockchain. Then, in this example, platform 410 may determine that the metadata associated with the second new block does not match the expected metadata. In other words, in this example, platform 410 may determine that the additional key of the first new block and at least one key from the second new block do not form a complementary key pair. In this scenario, in step 518, platform 410 may generate a second notification indicating that the second new block should not be added to the blockchain. The notification may indicate the source of the data block being considered for addition to the blockchain, the problem with the data block, and the action to the taken, as shown in FIG. 7. If, on the other hand, platform 410 had determined that the metadata associated with the second new block does match the expected metadata to be included in the subsequent block, then platform 410 may have added the second new block to the blockchain and generated a notification indicating that the second new block has been added.

Figure 5F:
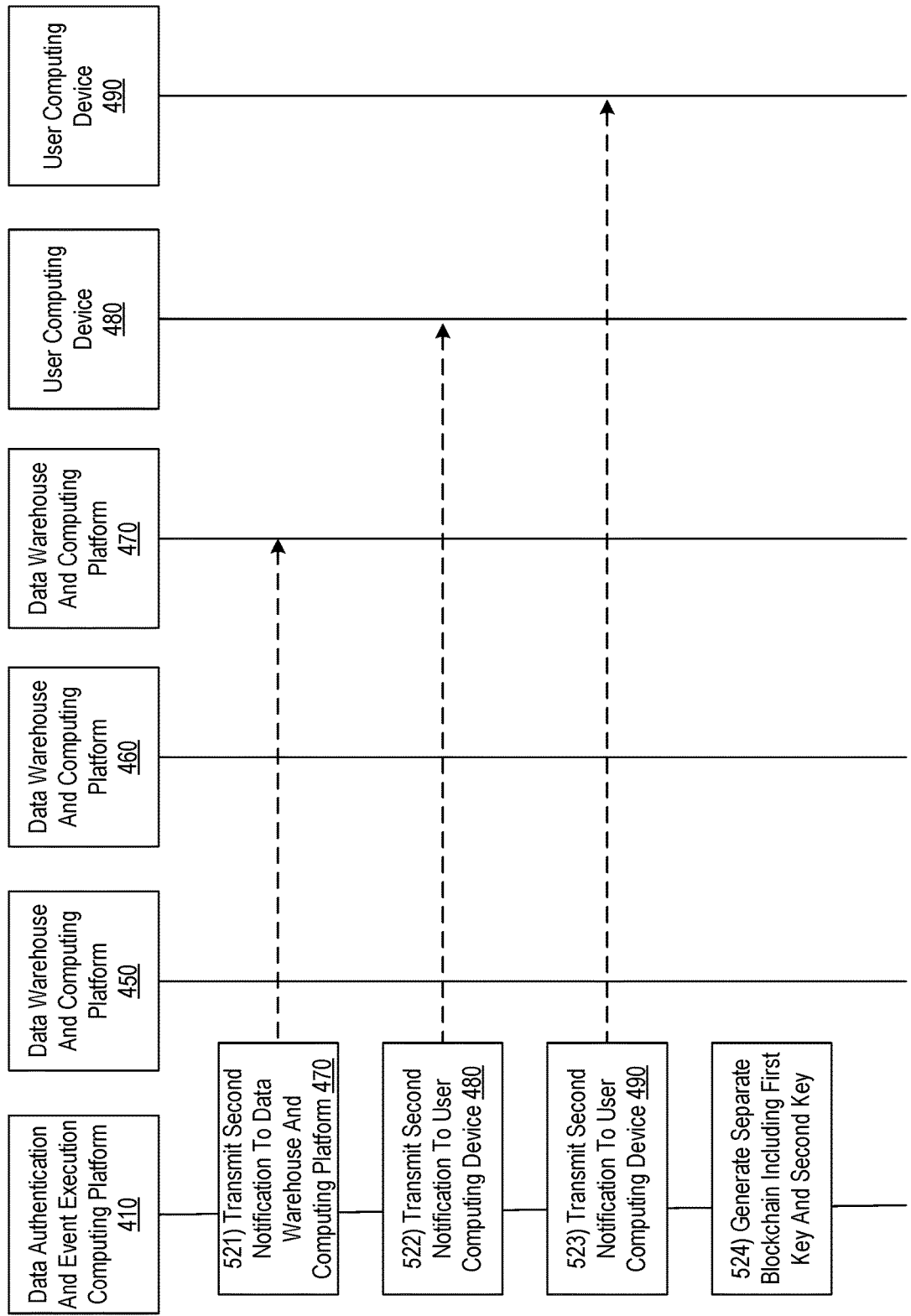

Referring to FIGS. 5E-5F, the process may then move to steps 519-523, where platform 410 may transmit the second notification to each of data warehouse and computing platforms 450-470 and user computing devices 480-490 (assuming that platform 410 has determined that the second new block should not be added to the blockchain). In other examples, platform 410 may transmit the second notification to fewer than all of the devices and computing platforms operating in environment 400. Next, in step 524, platform 410 may generate a separate blockchain including the first key (from the first new block) and the second key (from the most recently added block before the first new block was added). This separate blockchain may serve as an audit trail of the original blockchain because the separate blockchain may include the complementary key pairs connecting each block in the original blockchain and any associated metadata. In other words, all of the complementary key pairs from the original blockchain may be added to this separate blockchain.

Figure 5G:
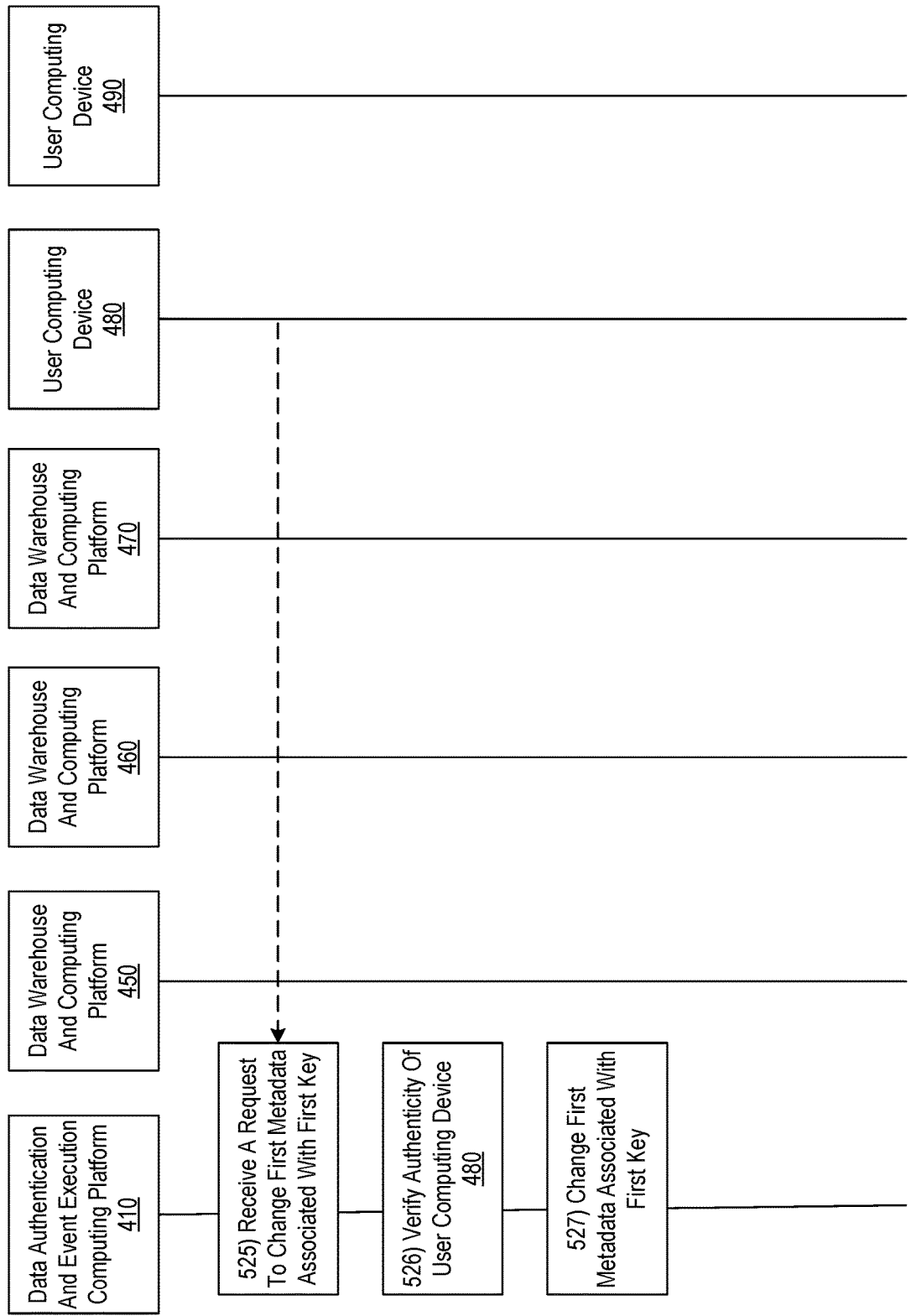

Referring to FIG. 5G, in step 525, platform 410 may then receive, from user computing device 480, a request to change the first metadata associated with the first key of the first new block. Generally, platform 410 may receive the request to change the first metadata from any of the devices or computing platforms operating in environment 400. In one example, the request may be motivated by a change in the parameters for determining what the next block in the blockchain should be. For example, if a blockchain maintained by data authentication and event execution computing platform 410 relates to the health records of a given user, the latest block in the blockchain may relate to the health checkup of the user from his most recent visit to the doctor. A key associated with that latest block may be configured to pair with a key associated with a new block including information from the user's health checkup in one year's time (i.e., the user's next annual health checkup). However, the user may realize six months from his last checkup that he will need to see the physician for an unanticipated illness. In that scenario, the user may transmit (using user computing device 480) a request to change the first metadata associated with the first key of the first new block so that the first key will pair with a key associated with a new block including information from the user's health checkup in six months time (rather than pairing with a key associated with a new block including information from the user's health checkup in one year's time).

Then in step 526, data authentication and event execution computing platform 410 may verify the authenticity of the device making the request to change the first metadata associated with the first key of the first new block. Platform 410 may perform this verification in a variety of ways. For example, platform 410 may determine if the request received in step 525 was actually received from user computing device 480 by sending a separate message via an alternate communication medium to a user known to be associated with user computing device 480. Finally, once the authenticity of the device making the request to change the first metadata associated with the first key of the first new block has been verified, platform 410 may, in step 527, change the first metadata in accordance with the request. Following this change, platform 410 may transmit the updated blockchain to all of the other devices and computing platforms operating in environment 400.

Figure 8:
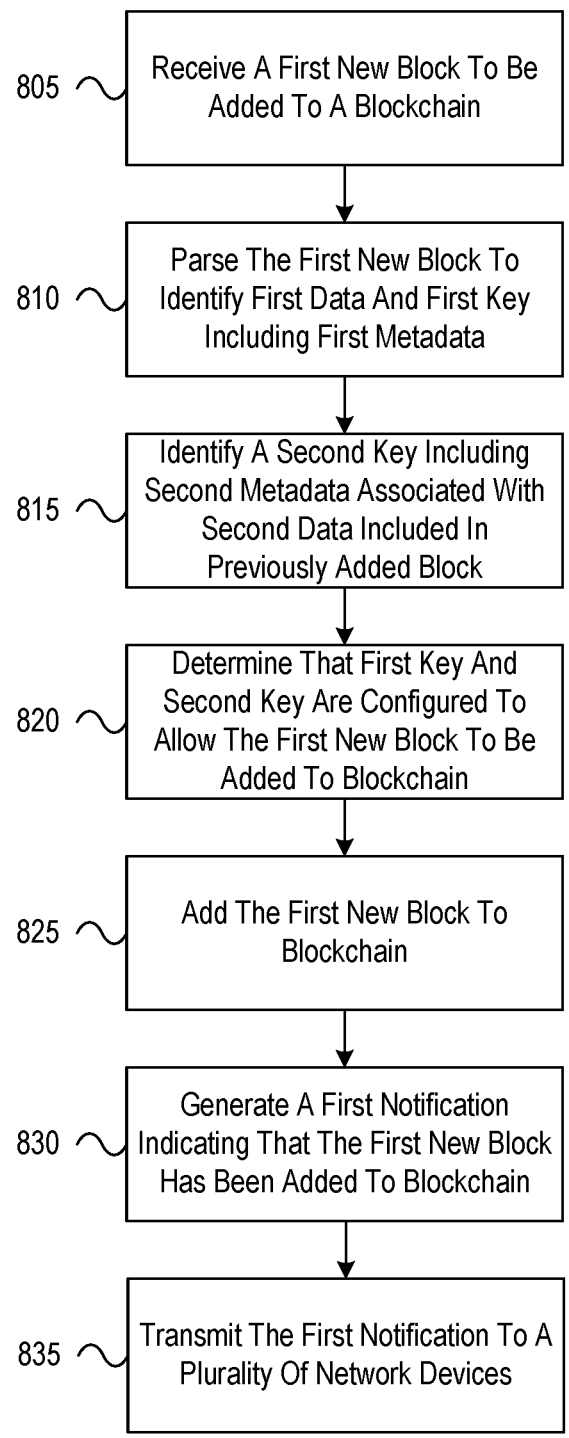
FIG. 8 depicts an illustrative method for authentication of user data and execution of events based on the authentication in accordance with one or more example embodiments.

FIG. 8 depicts an illustrative method for authentication of user data and execution of events based on the authentication in accordance with one or more example embodiments. Referring to FIG. 8, at step 805, a computing platform having at least one processor, a memory, and a communication interface may receive a first new block to be added to a blockchain associated with a predetermined topic. Subsequently, at step 810, the computing platform may parse the first new block to identify first data and a first key including first metadata associated with the first data. Then, at step 815, the computing platform may identify a second key including second metadata associated with second data included in a previously added block of the blockchain. At step 820, the computing platform may determine that the first key and the second key are configured to allow the first new block to be added to the blockchain. Next, in step 825, the computing platform may add the first new block to the blockchain based on the determination that the first key and the second key are configured to allow the first new block to be added to the blockchain. Then, in step 830, the computing platform may generate a first notification indicating that the first new block has been added to the blockchain. Finally, in step 835, the computing platform may transmit, via the communication module, the first notification to a plurality of network devices.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
  receive, via the communication interface, a first new block to be added to a blockchain associated with a predetermined topic, the first new block including two different keys including a first key and a second, different key;
  parse the first new block to identify first data including a first identifier providing additional security for securing information in the blockchain, the first key, and the second, different key, the first key including first metadata associated with the first data and forming a complementary key pair with a complementary key on a most recently added block of the blockchain, and the second key forming a complementary key pair with a block of the blockchain added subsequent to the first new block;
  identify a third key including second metadata associated with second data included in the most recently added block of the blockchain;
  determine that the first key and the third key are complementary key pairs and are configured to allow the first new block to be added to the blockchain, determining that the first key and third key are complementary key pairs including at least recognizing that the third key includes a second identifier that is a complementary identifier of the first identifier and wherein determining that the first key and the third key are complementary key pairs and are configured to allow the first new block to be added to the blockchain further includes determining that the first data and the second data are associated with a first sensitivity level;

based on the determination that the first key and the third key are complementary key pairs and are configured to allow the first new block to be added to the blockchain, add the first new block to the blockchain;

generate a first notification indicating that the first new block has been added to the blockchain; and transmit, via the communication interface, the first notification to a plurality of network devices.

2. The computing platform of claim 1, wherein the first data has been encrypted using a first hashing algorithm and the first key has not been encrypted.

3. The computing platform of claim 1, wherein determining that the first key and the third key are complementary key pairs and are configured to allow the first new block to be added to the blockchain further includes determining that the first key and the third key form a public and private key relationship.

4. The computing platform of claim 1, wherein determining that the first key and the third key are complementary key pairs and are configured to allow the first new block to be added to the blockchain further includes determining that the first data and the second data are associated with a first geographic location.

5. The computing platform of claim 1, wherein determining that the first key and the third key are complementary key pairs and are configured to allow the first new block to be added to the blockchain further includes determining that the first data and the second data are associated with the predetermined topic.

6. The computing platform of claim 1, wherein the first metadata provides a summary of information included in the first data and the second metadata provides a summary of information included in the second data.

7. The computing platform of claim 1, wherein determining that the first key and the third key are complementary key pairs and are configured to allow the first new block to be added to the blockchain further includes determining that the first data and the second data are associated with a predetermined checksum value.

8. The computing platform of claim 1, wherein the memory stores additional computer-readable instructions that, when executed by the at least one processor, cause the computing platform to:
receive, via the communication interface, a plurality of authorizations to add the first new block to the blockchain from a quorum of the plurality of network devices.

9. The computing platform of claim 8, wherein adding the first new block to the blockchain is further based on the plurality of authorizations received from the quorum of the plurality of network devices.

10. The computing platform of claim 1, wherein determining that the first key and the third key are complementary key pairs and are configured to allow the first new block to be added to the blockchain further includes determining that the first data is associated with a first time period and the second data is associated with a second time period, wherein the first time period occurs after the second time period.

11. The computing platform of claim 1, wherein the memory stores additional computer-readable instructions that, when executed by the at least one processor, cause the computing platform to:
receive, via the communication interface, a second new block including fourth data and a fourth key, wherein the fourth key includes fourth metadata associated with the fourth data.

12. The computing platform of claim 11, wherein the memory stores additional computer-readable instructions that, when executed by the at least one processor, cause the computing platform to:
determine that the fourth key is not a complementary key pair to the second key.

13. The computing platform of claim 12, wherein the memory stores additional computer-readable instructions that, when executed by the at least one processor, cause the computing platform to:
based on the determination that the fourth key is not a complementary key pair to the second key, generate a second notification indicating that the second new block should not be added to the blockchain.

14. The computing platform of claim 13, wherein the memory stores additional computer-readable instructions that, when executed by the at least one processor, cause the computing platform to:
transmit, via the communication interface, the second notification to the plurality of network devices.

15. A method, comprising:
at a computing platform comprising at least one processor, memory, and a communication interface:
receiving, via the communication interface, a first new block to be added to a blockchain associated with a predetermined topic, the first new block including two different keys including a first key and a second, different key;
parsing the first new block to identify first data including a first identifier providing additional security for securing information in the blockchain, the first key, and the second, different key, the first key including first metadata associated with the first data and forming a complementary key pair with a complementary key on a most recently added block of the blockchain, and the second key forming a complementary key pair with a block of the blockchain added subsequent to the first new block;
identifying a third key including second metadata associated with second data included in the most recently added block of the blockchain;
determining that the first key and the third key are complementary key pairs and are configured to allow the first new block to be added to the blockchain, determining that the first key and third key are complementary key pairs including at least recognizing that the third key includes a second identifier that is a complementary identifier of the first identifier and wherein determining that the first key and the third key are complementary key pairs and are configured to allow the first new block to be added to the blockchain further includes determining that the first data and the second data are associated with a first sensitivity level;
based on the determination that the first key and the third key are complementary key pairs and are configured to allow the first new block to be added to the blockchain, adding the first new block to the blockchain;

generating a first notification indicating that the first new block has been added to the blockchain; and transmitting, via the communication interface, the first notification to a plurality of network devices.

16. The method of claim 15, wherein determining that the first key and the third key are complementary key pairs and are configured to allow the first new block to be added to the blockchain further includes determining that the first data and the second data are associated with a first geographic location.

17. The method of claim 15, wherein determining that the first key and the third key are complementary key pairs and are configured to allow the first new block to be added to the blockchain further includes determining that the first data is associated with a first time period and the second data is associated with a second time period, wherein the first time period occurs after the second time period.

18. One or more non-transitory computer-readable media storing instructions that, when executed by a computing platform comprising at least one processor, memory, and a communication interface, cause the computing platform to:

receive, via the communication interface, a first new block to be added to a blockchain associated with a predetermined topic, the first new block including two different keys including a first key and a second, different key;

parse the first new block to identify first data including a first identifier providing additional security for securing information in the blockchain, the first key, and the second, different key, the first key including first metadata associated with the first data and forming a complementary key pair with a complementary key on a most recently added block of the blockchain, and the second key forming a complementary key pair with a block of the blockchain added subsequent to the first new block;

identify a third key including second metadata associated with second data included in the most recently added block of the blockchain;

determine that the first key and the third key are complementary key pairs and are configured to allow the first new block to be added to the blockchain, determining that the first key and third key are complementary key pairs including at least recognizing that the third key includes a second identifier that is a complementary identifier of the first identifier and wherein determining that the first key and the third key are complementary key pairs and are configured to allow the first new block to be added to the blockchain further includes determining that the first data and the second data are associated with a first sensitivity level;

based on the determination that the first key and the third key are complementary key pairs and are configured to allow the first new block to be added to the blockchain, add the first new block to the blockchain;

generate a first notification indicating that the first new block has been added to the blockchain; and transmit, via the communication interface, the first notification to a plurality of network devices.

* * * * *